United States Patent
Kato

(10) Patent No.: US 7,542,163 B2
(45) Date of Patent: Jun. 2, 2009

(54) METHOD AND APPARATUS FOR CONTROLLING PRINTING

(75) Inventor: Hisashi Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 911 days.

(21) Appl. No.: 10/774,477

(22) Filed: Feb. 10, 2004

(65) Prior Publication Data

US 2005/0264591 A1 Dec. 1, 2005

(30) Foreign Application Priority Data

Feb. 12, 2003 (JP) ............................. 2003-034339

(51) Int. Cl.
*G06K 15/02* (2006.01)
(52) U.S. Cl. .................. 358/1.2; 358/1.18; 358/1.9
(58) Field of Classification Search ........... 358/1.1–1.9, 358/1.11–1.18; 399/159; 382/180; 400/188
See application file for complete search history.

(56) References Cited

U.S. PATENT DOCUMENTS 5,987,227 A * 11/1999 Endo et al. ................. 358/1.13
6,168,327 B1 * 1/2001 Tsuzuki ..................... 400/188
6,507,411 B1 * 1/2003 Nishikawa et al. ........... 358/1.2

* cited by examiner

*Primary Examiner*—King Y Poon
*Assistant Examiner*—Lennin R Rodriguez
(74) *Attorney, Agent, or Firm*—Fitzpatrick, Cella, Harper & Scinto

(57) ABSTRACT

Poster printing and double-sided printing are realized concurrently by controlling an order of outputting pages for a divided image. A printer prints two consecutive pages of print data on both sides of a sheet of paper, and a host computer generates print data such that each page of print data is enlarged and divided and resultant data is printed on a plurality of media. A first page of print data is divided into a predetermined number of pieces in accordance with the number of sheets of print paper, and a second page of print data is divided in the same manner. Respective pieces of print data for the first and second pages are selected from the pieces of print data. Then, the selected pieces of print data for the first and second pages are printed on front and back sides, respectively, of a medium.

9 Claims, 20 Drawing Sheets

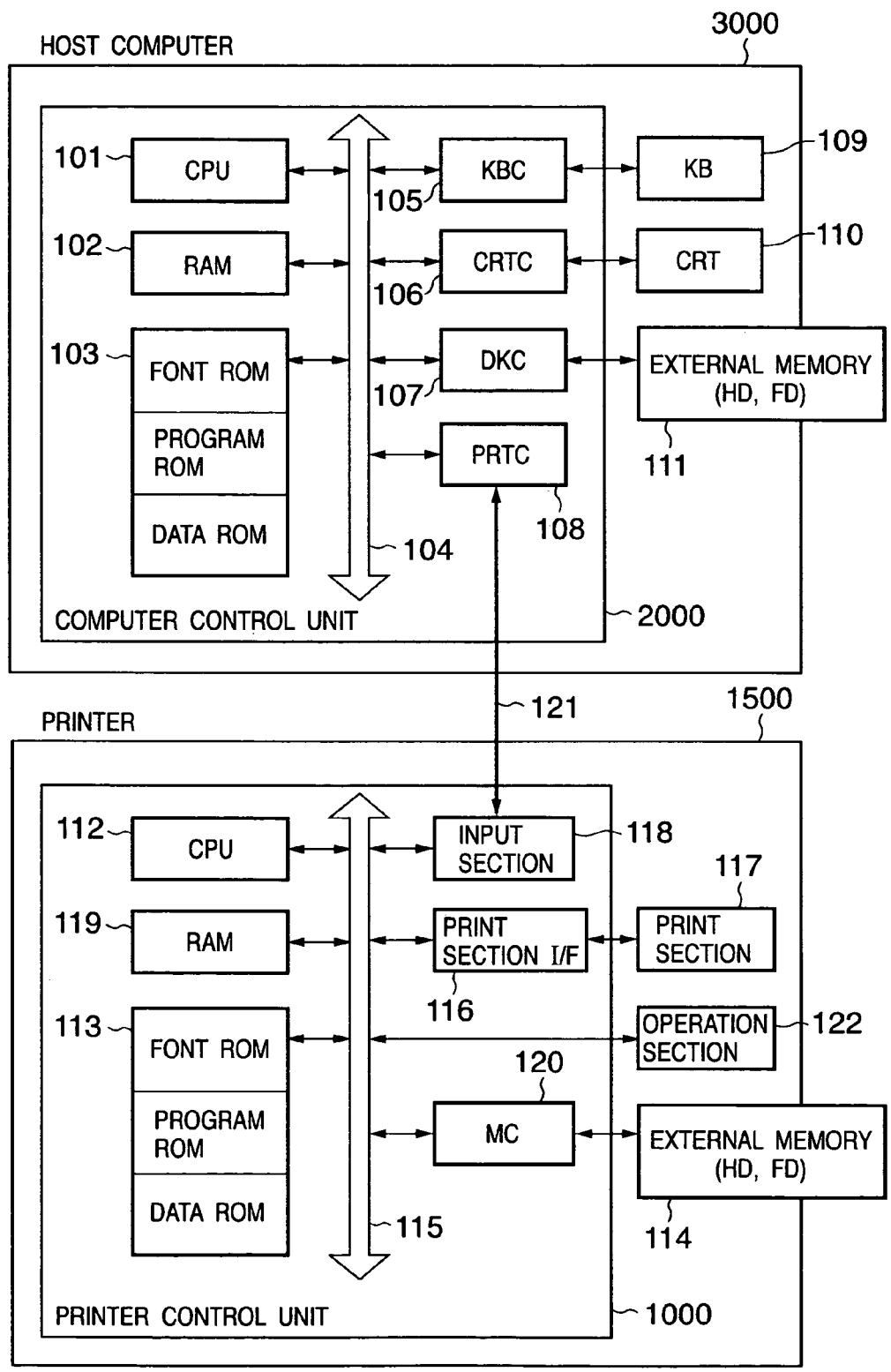
F I G. 1

FIG. 6

| 1 | 2 | 3 |
|---|---|---|
| 4 | 5 | 6 |
| 7 | 8 | 9 |

ARRANGED RIGHTWARD
FROM UPPER LEFT,
AND TOP TO BOTTOM

FIG. 7

| 9 | 8 | 7 |
|---|---|---|
| 6 | 5 | 4 |
| 3 | 2 | 1 |

ARRANGED LEFTWARD FROM LOWER RIGHT, AND BOTTOM TO TOP

OUTPUT : 2×2,
ENLAGEMENT RATE 150%

OUTPUT : 1×2, LANDSCAPE

FIRST PAGE
(LOGICAL PAGE)

SECOND PAGE
(LOGICAL PAGE)

METHOD AND APPARATUS FOR CONTROLLING PRINTING

FIELD OF THE INVENTION

The present invention relates to a technique for controlling printing in which an image is enlarged and divided so that it is printed over a plurality of media.

BACKGROUND OF THE INVENTION

Some printers or printing systems of today have been known for having a print enlargement function (hereinafter, referred to as a "poster printing function") of enlarging and dividing an image on a page so that a resultant image is printed over several sheets of paper. With this function, an output of the enlarged image can be obtained by combining sheets of paper delivered in an order according to a manner of dividing the image.

However, the poster printing function provided in the conventional printers only supports single-sided printing, and printers having both a double-sided printing function and the poster printing function have not been realized. This is probably because an arrangement of papers on which a divided image is printed is different between front and back sides under double-sided poster printing, which should be considered carefully to obtain an accurate output result.

SUMMARY OF THE INVENTION

The present invention has been proposed to solve the conventional problems, and has an its object to provide a method and apparatus for controlling printing capable of suitably controlling an order of outputting papers on which a divided image is printed, thereby to realize both poster printing and double-sided printing simultaneously.

In order to solve the aforementioned problems, according to the present invention, a method of controlling printing by which a printer capable of double-sided printing prints two consecutive pages of print data on both sides of medium and also enlarges and divides each of the pages of print data so that resultant data is printed over a plurality of media, comprises:

a first dividing step of dividing a first page of print data into a predetermined number of pieces of print data;

a second dividing step of dividing a second page of print data into the predetermined number of pieces of print data;

a selecting step of selecting one from the predetermined pieces of print data obtained by dividing the first page of print data in the first dividing step, and selecting one from the predetermined pieces of print data obtained by dividing the second page of print data in the second dividing step; and a printing step of printing the one piece of the first page of print data and the one piece of the second page of print data selected in the selecting step, on a front side and a back side, respectively, of a medium.

Furthermore, according to the present invention, a printing control apparatus for generating print data such that two consecutive pages of the print data are printed on both sides of medium by a printer capable of double-sided printing and also that each of the pages of print data is enlarged and divided so that resultant data is printed over a plurality of media, the apparatus comprises:

first dividing means for dividing a first page of print data into a predetermined number of pieces of print data;

second dividing means for dividing a second page of print data into the predetermined number of pieces of print data;

selecting means for selecting one from the predetermined number of pieces of print data obtained by dividing the first page of print data by the first dividing means, and selecting one from the predetermined pieces of print data obtained by dividing the second page of print data by the second dividing means; and output means for outputting in turn to the printer, the one piece of the first page of print data and the one piece of the second page of print data selected by the selecting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing a configuration of a printing system according to one embodiment of the present invention;

FIG. 6 is a diagram exemplarily showing an arrangement of output sheets of paper in poster printing performed in a forward order;

FIG. 7 is a diagram exemplarily showing an arrangement of output sheets of paper in poster printing performed in a reverse order;

DETAILED DESCRIPTION OF THE PREFERRED EMBODIMENTS

Figure 2:
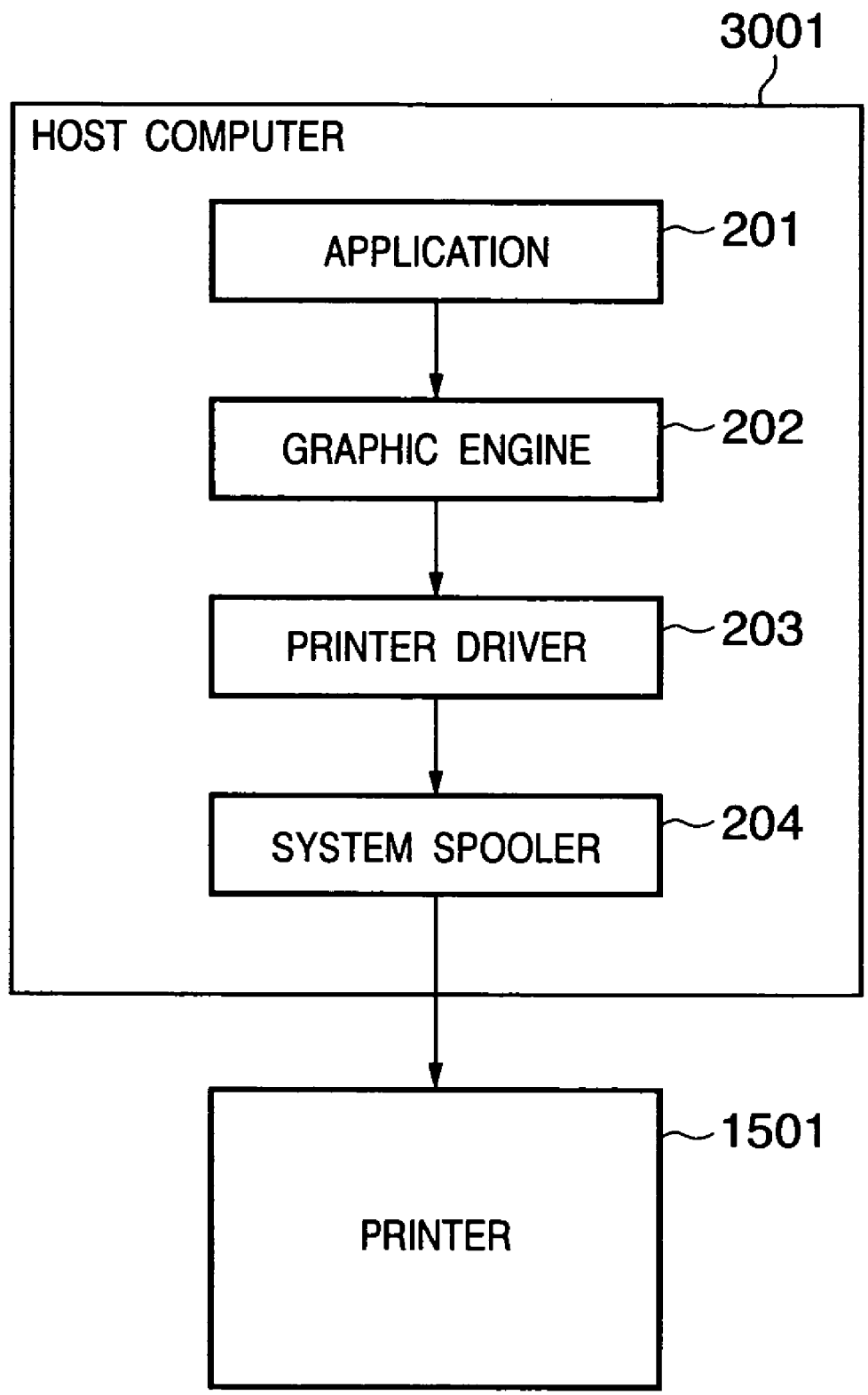
FIG. 2 is a block diagram showing a detailed configuration for typical print control processing executed by a host computer 3001 connected to a printer 1501.

Referring now to the drawings, descriptions will be provided below for a printer having a function of simultaneously realizing both poster printing and double-sided printing, and a method for controlling the printer, according to preferred embodiments of the present invention.

[Configuration of Printing System]

FIG. 1 is a block diagram showing a configuration of a printing system according to one embodiment of the present invention. As apparent from FIG. 1, the printing system according to this embodiment is so configured that a host computer 3000 and a printer 1500 are connected with each other via a bi-directional interface. Unless otherwise specified, the present invention is applicable to any of a stand-alone device, a system comprising a plurality of devices, or a system capable of printing processing connected via a network such as a LAN or WAN, as long as both the poster print function and double-sided print function of the present invention can be realized simultaneously.

In the host computer 3000 of FIG. 1, a computer control unit 2000 is connected each of a keyboard (KB) 109, a CRT display (CRT) 110, and an external memory 111 such as a hard disk (HD), a flexible disk (FD), or the like.

The computer control unit 2000 comprises a CPU 101 for processing a document containing graphics, images, characters, and tables (including spreadsheets and the like) based on a document processing program stored in a program ROM of a ROM 103 described later or in the external memory 111. The CPU 101 integrally controls devices connected to a system bus 104.

The ROM 103 described above is connected to the system bus 104. The program ROM in the ROM 103 or the external memory 111 stores therein an operating system program (OS) which is a control program of the CPU 101, a printer driver described later, or the like. Also, a font ROM in the ROM 103 or the external memory 111 stores therein font data used in the document processing, or the like, and a data ROM in the ROM 103 or the external memory 111 store therein various data used in the document processing.

A RAM 102 in the computer control unit 2000 is operable as a main memory, work area, and the like, of the CPU 101. A keyboard controller (KBC) 105 controls key inputs of a user through the KB 109 or a pointing device (not shown), the key inputs including data of various settings necessary for poster printing. A CRT controller (CRTC) 106 controls the display on the CRT 110.

A disk controller (DKC) 107 controls an access to the external memory 111 which stores therein a booting program, various applications, font data, user files, edited files, a program for generating printer control commands (referred to as a "printer driver" hereinafter), and the like. A printer controller (PRTC) 108 is connected to the printer 1500 via a bi-directional interface (I/F) 121 to control communication with the printer 1500.

The CPU 101 executes scaling outline fonts (hereinafter referred to as rasterizing) onto, e.g., a display information RAM set in the RAM 102, so as thereby to realize WYSIWYG by which an image to be printed is displayed on the CRT 110. The CPU 101 also opens various stored windows on the basis of commands pointed by a mouse cursor (not shown) or the like displayed on the CRT 110, and executes various data-processing.

Figure 5:
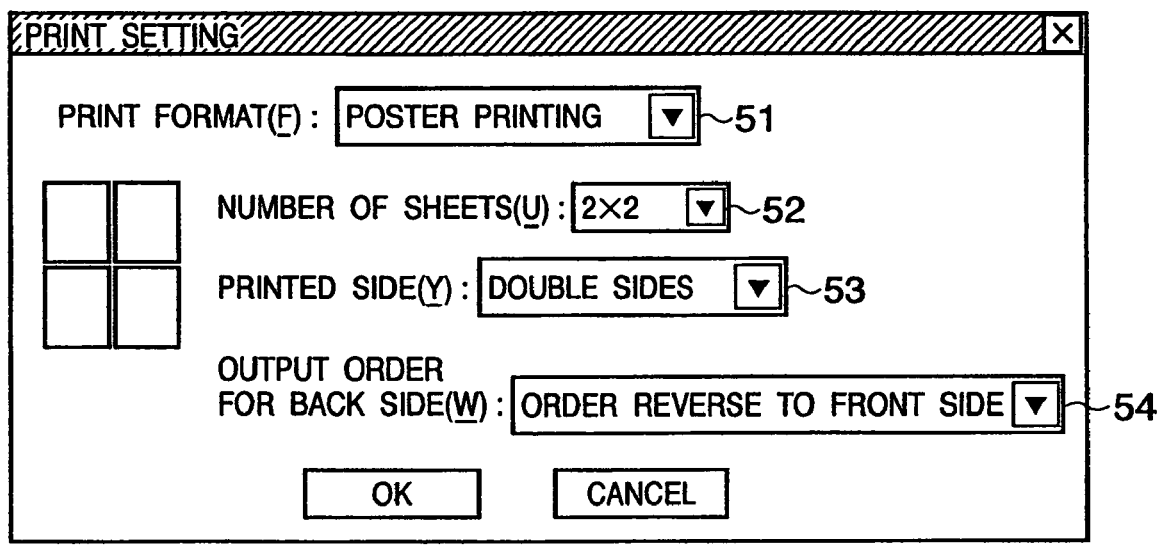
FIG. 5 is a diagram exemplarily showing a screen for designating poster printing.

In this embodiment, upon printing, a user opens a print setting window as shown in FIG. 5 extended from a detailed print setting screen of a printer driver, so as thereby to set for the printer driver a printing processing method including adjusting settings of the printer and selecting a print mode. FIG. 5 is a diagram exemplarily showing a screen for designating poster printing.

The printer 1500 is so configured that a printer control unit 1000 is connected to each of a print section (printer engine) 117, an operation section 122, and an external memory 114 such as an HD, FD, and the like. The printer 1500 is controlled by a CPU 112 in the printer control unit 1000. The CPU 112 outputs an image signal indicating output information to the print section 117 connected to a system bus 115, via print section I/F 116, on the basis of a control program stored in a program ROM of a ROM 113 described later or in the external memory 114.

The ROM 113 is connected to the system bus 115. The program ROM in the ROM 113 stores therein the control program for the CPU 112, and the like. A font ROM in the ROM 113 stores therein font data used in generating the output information. Also, a data ROM in the ROM 113 stores therein information used in the host computer 3000 when the printer has no external memory 114 such as an HD, and the like.

The CPU 112 is able to communicate with the host computer 3000 via an input section 118 so that information in the printer 1500 can be informed to the host computer 3000. A RAM 119 is operable as a main memory, work area, and the like, of the CPU 112, and the memory size thereof is expandable by additionally installing an option RAM to be connected to an expansion port (not shown). Furthermore, the RAM 119 is used as an output information expanding area, environment data storage area, NVRAM, or the like.

Access to the aforementioned external memory 114 such as a HD, IC card, or the like, is controlled by a memory controller (MC) 120. The external memory 114 is optionally connectable to the printer 1500, and stores therein font data, an emulation program, form data, and the like. The operation section 122 is provided with switches operated by a user, LED indicators, and the like.

The external memory 114 in the printer 1500 is not limited to a single memory, and it is allowable to provide a plurality of these memories. For example, the printer 1500 may alternatively be configured so that it is connectable with a plurality of external memories storing built-in fonts as well as programs for interpreting option cards and printer control languages of different language systems. Also, the external memory 114 may have an NVRAM (not shown) for storing printer mode setting information input by a user through the operation section 122.

[Configuration and Operation of Host Computer]

FIG. 2 is a block diagram showing a detailed configuration for typical print control processing executed by a host computer 3001 connected to a printer 1501. The printer 1501 and the host computer 3001 may be interconnected either directly or via a network.

Referring to FIG. 2, an application 201, graphic engine 202, printer driver 203, and system spooler 204 in the host computer 3001 are retained as a file in the external memory 111. These are program modules which, when they are to be executed, are loaded in the RAM 102 and executed by an OS or by modules which utilize these modules. The application 201 and the printer driver 203 can be additionally stored in an FD or CD-ROM of the external memory 111 or stored in a HD of the external memory 111 via a network (not shown).

The application 201 stored in the external memory 111 is executed upon being loaded in the RAM 102, as it is described above. When the application 201 directs the printer 1500 to carry out printing, the graphic engine 202, which is similarly executable upon being loaded in the RAM 102, is used for outputting (rendering) data.

The graphic engine 202 also loads the printer driver 203, which is prepared for each printer, from the external memory 111 onto the RAM 102, and then converts the output of the application 201 to printer control commands by using the printer driver 203. The printer control commands obtained by the conversion are output to the printer 1500 via the interface 121, by way of a system spooler 204 that has been loaded onto the RAM 102 by the OS.

Figure 3:
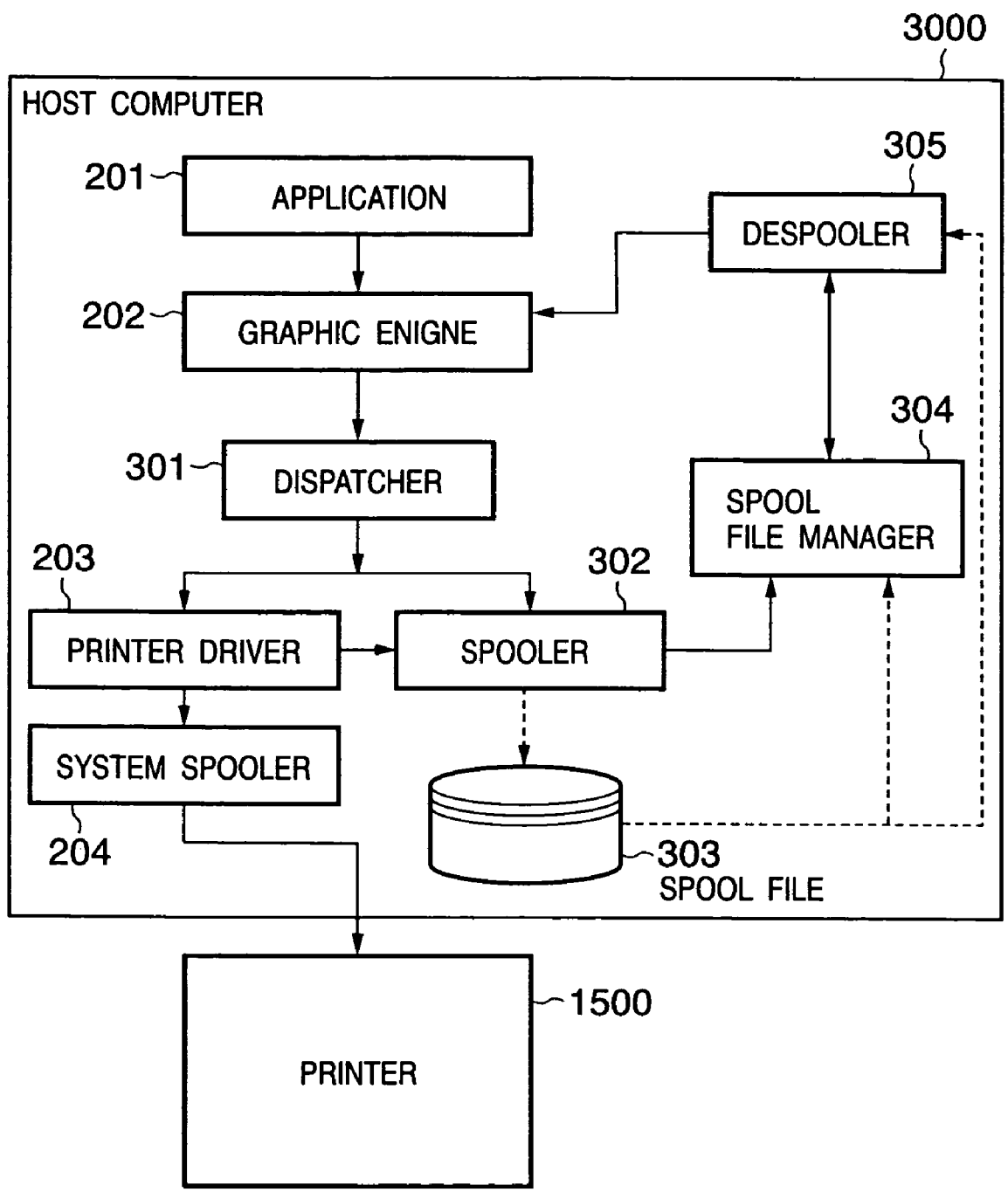
FIG. 3 is a block diagram showing a detailed configuration of a host computer 3000 in a printing system according to the embodiment, which is extended based on the printing system of FIG. 2.

The host computer 3000 of the printing system according to this embodiment has a configuration shown in FIG. 3 in which print data from the application 201 is temporarily spooled in the form of intermediate code data, in addition to the configuration of the host computer 3001 of the printing system shown in FIG. 2.

FIG. 3 is a block diagram showing a detailed configuration of the host computer 3000 in the printing system according to this embodiment, which is extended from the printing system of FIG. 2. In this embodiment, as shown in FIG. 3, a spool file 303 composed of intermediate codes is generated temporarily when a print instruction is sent from the graphic engine 202 to the printer driver 203.

In the printing system of FIG. 2, the application 201 is freed from printing processing when the printer driver 203 has completed the conversion of all print instructions coming from the graphic engine 202 to printer control commands. In contrast, in the printing system of FIG. 3, a spooler 302 converts all print instructions to intermediate code data, and the application 201 is freed from printing processing when the spooler 302 has output the code data to a spool file 303. Accordingly, the printing system of FIG. 3 requires less processing time than that of FIG. 2.

Further, the printing system shown in FIG. 3 allows the content of the spool file 303 to be processed. This realizes a function that is not presented by the application 201. For example, the print data from the application 201 can be processed so that a plurality of pages of the print data may be reduced to fit within a single page. Further, this makes it possible to implement a print enlargement function (poster printing function).

As described above, the printing system according to this embodiment is, in contrast to the printing system of FIG. 2, expanded in such a manner that print data is spooled in the form of intermediate code data as shown in FIG. 3. In order to process the print data, an operator usually makes settings on a window provided by the printer driver 203, and then the printer driver 203 stores the settings in the RAM 102 or external memory 111.

Figure 20:
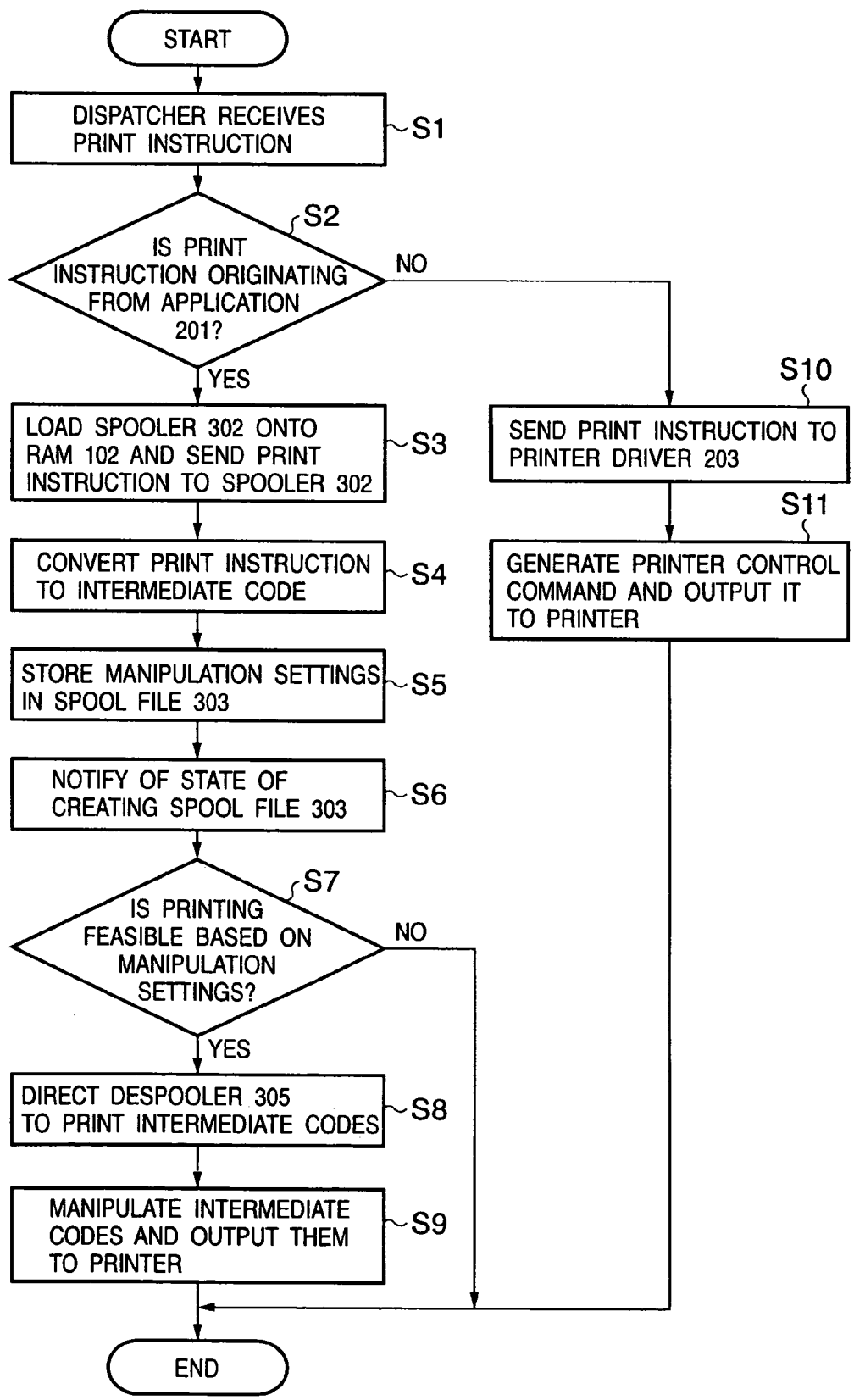
FIG. 20 is a flowchart illustrating printer control command generating processing executed by the host computer 3000 of the printing system according to the embodiment of the present invention.

Next paragraphs are detailed descriptions about printer control command generating processing executed in the host computer 3000 of the printing system in FIG. 3. FIG. 20 is a flowchart illustrating the printer control command generating processing executed by the host computer 3000 of the printing system according to the embodiment. As previously mentioned, the printing system in FIG. 3 is designed so that a print instruction from the graphic engine 202 is received by a dispatcher 301 (step S1).

Next, it is determined whether the print instruction received from the graphic engine 202 by the dispatcher 301 is the same as that issued from the application 201 to the graphic engine 202 (step S2). If both are the same, the dispatcher 301 loads the spooler 302 stored in the external memory 111 onto the RAM 102, and sends the print instruction not to the printer driver 203 but to the spooler 302 (step S3).

The spooler 302 converts the received print instruction to an intermediate code and then outputs the code to the spool file 303 (step S4). The spooler 302 further acquires from the printer driver 203 manipulation settings related to print established for the printer driver 203, and stores them into the spool file 303 (step S5). Although the spool file 303 is created as a file in the external memory 111, it may alternatively be created in the RAM 102.

Furthermore, the spooler 302 loads a spool file manager 304 stored in the external memory 111 onto the RAM 102, and notifies the spool file manager 304 of the state of creating spool files (step S6). Subsequently, the spool file manager 304 determines whether printing is feasible in accordance with the manipulation settings related to the print data stored in the spool file 303 (step S7).

When determining that printing is feasible using the graphic engine 202 (Yes), the spool file manager 304 loads onto the RAM 102 a despooler 305 stored in the external memory 111, and directs the despooler 305 to print the intermediate codes described in the spool file 303 (step S8). The despooler 305 manipulates the intermediate codes contained in the spool file 303 in accordance with the manipulation settings in the spool file 303, and outputs the resultant codes again via the graphic engine 202 (step S9), at which time the spool file manager 304 displays printing progress.

In the case where in the step S7 the dispatcher 301 receives from the graphic engine 202 the print instruction issued by the despooler 305 to the graphic engine 202 (No), the dispatcher 301 sends the print instruction to the printer driver 203 and not to the spooler 302 (step S10). The printer driver 203 generates a printer control command and outputs the command via the system spooler 204 to the printer 1500 (step S11).

When in the step S7 the spool file manager 304 has not determined that printing is feasible in accordance with the manipulation settings related to the print data stored in the spool file 303 (No), the spool file manager 304 does not direct the despooler 305 to print the intermediate codes described in the spool file 303.

[Structure and Operations of Printer]

Figure 19:
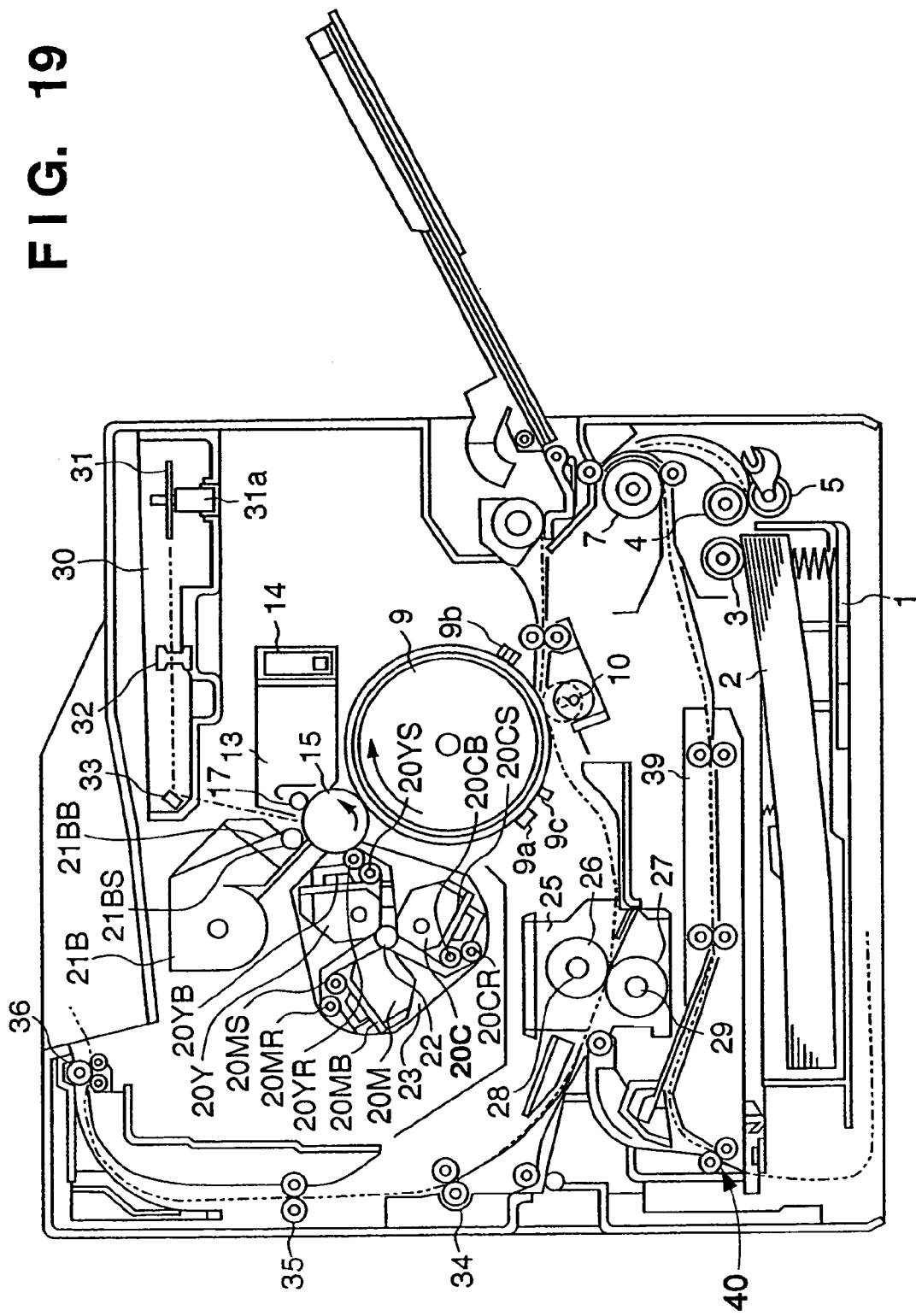
FIG. 19 is a sectional view of a color laser beam printer having the double-sided printing function which is illustrated as one example of the printer 1500.

FIG. 19 is a sectional view of a color laser beam printer having a double-sided printing function, which is illustrated as one example of the printer 1500. The printer 1500 is so constructed that a laser beam that has been modulated by image data of color components obtained based upon print data entered from the host computer 3000, is reflected by a polygon mirror 31 so that a photosensitive drum 15 is scanned by the reflected laser beam to form electrostatic latent images. Visible images are obtained by developing the latent images using toner and the visible images for all colors are transferred to an intermediate transfer body 9 to obtain a full-color visible image. The visible color image is further transferred to and fixed on a transfer medium 2. The image forming unit that performs the above-described control comprises a drum unit 13 having the photosensitive drum 15, a primary charging unit having a contact-type charging roller 17, a cleaning unit, a developing unit, the intermediate transfer body 9, a paper-feeding unit including a paper cassette 1 and various rollers 3, 4, 5, and 7, a transfer unit having a transfer roller 10, and a fixing unit 25.

The drum unit 13 is constructed by integrating the photosensitive drum (photoreceptor) 15 with a cleaner container 14 having a cleaning mechanism that serves also as a holder of the photosensitive drum 15. The drum unit 13 is supported to the printer body in a freely attachable and detachable manner and is replaceable with ease when the photosensitive drum 15 reaches the end of its service life. The photosensitive drum 15 includes an aluminum cylinder the peripheral surface of which is coated with an organic photoconductor layer, and is rotatably supported on the cleaner container 14. The photosensitive drum 15 is rotated by transmission of the driving force from a drive motor (not shown), the drive motor rotating the photosensitive drum 15 counter-clockwise in conformity with the image forming operation. The electrostatic latent image is formed by selectively exposing the surface of the photosensitive drum 15. The scanner 30 has a motor 31a by which the polygon mirror is rotated in synchronization with a horizontal synchronizing signal of the image signal, whereby the modulated laser beam is reflected to irradiate the photosensitive drum 15 via a lens 32 and reflecting mirror 33.

In order to make the electrostatic latent image visible, the developing unit has three color developing units 20Y, 20M, 20C for developing the colors yellow (Y), magenta (M) and cyan (C), respectively, and a single black developing unit 21B for developing the color black (B). The color developing units 20Y, 20M, 20C and black developing unit 21B are provided with sleeves 20YS, 20MS, 20CS and 21BS, respectively, and with coating blades 20YB, 20MB, 20CB and 21BB, respectively, which are in pressured contact with the outer peripheries of the respective sleeves 20YS, 20MS, 20CS, and 20BS, respectively. The three color developing units 20Y, 20M, 20C are further provided with coating rollers 20YR, 20MR, 20CR, respectively.

The black developing unit 21B is mounted on the printer body in a freely attachable and detachable manner. The color developing units 20Y, 20M, 20C are mounted, also in a freely attachable and detachable manner, on a developing rotary 23 which rotates about a rotary shaft 22.

The sleeve 21BS of the black developing unit 21B is spaced away from the photosensitive drum 15 by a minute distance of, e.g., 300 μm. The black developing unit 21B transports toner by an internally provided feed member and applies an electric charge to the toner by frictional charging in such a manner that a coating blade 21BB may coat the toner on the outer periphery of the sleeve 21BS that rotates in the clockwise direction. Further, by applying a developing bias to the sleeve 21BS, the toner on the photosensitive drum 15 is developed in conformity with the electrostatic latent image, whereby a visible image is formed on the photosensitive drum 15 by the black toner.

The three color developing units 20Y, 20M, 20C rotate along with the developing rotary 23 at the time of image formation so that the predetermined ones of the sleeves 20YS, 20MS, 20CS are made to oppose the surface of the photosensitive drum 15 across minutely small distances of 300 μm. As a result, the predetermined ones of the color developing units 20Y, 20M, 20C are stopped at a developing position relative to the photosensitive drum 15 so that a visible image is formed on the photosensitive drum 15.

When the color image is formed, a developing process is executed where the developing rotary 23 is rotated per each revolution of the intermediate transfer body 9 so that development is performed by the yellow developing unit 20Y, magenta developing unit 20M, cyan developing unit 20C and black developing unit 21B, in the order mentioned. The intermediate transfer body 9 makes four revolutions to successively form visible images using the yellow, magenta, cyan and black toners. As a result, a full-color visible image is formed on the intermediate transfer body 9.

The intermediate transfer body 9 is designed to contact the photosensitive drum 15 and to rotate attendant upon rotation of the photosensitive drum 15. The intermediate transfer body 9 rotates clockwise at the time of formation of the color image and receives transfer of the four visible images from the photosensitive drum 15. At the time of image formation, the transfer roller 10, described later, contacts the intermediate transfer body 9 and transports a transfer medium 2 embraced by the intermediate transfer body 9 and the transfer roller 10, whereby the visible color images on the intermediate transfer body 9 are transferred to the transfer medium 2 simultaneously. Disposed about the periphery of the intermediate transfer body 9 are a TOP sensor 9a and an RS sensor 9b, which sense the position of the intermediate transfer body 9, and a density sensor 9c for sensing the density of the toner image that has been transferred to the intermediate transfer body 9.

The transfer roller 10 has a transfer charging device supported so as to be capable of contacting and separating from the photosensitive drum 15. The transfer roller 10 is constructed by winding a foamed elastic body of intermediate resistivity on a metal shaft. As indicated by the solid line in FIG. 19, the transfer roller 10 is downward spaced away from the intermediate transfer body 9 so that the visible color images will not be disturbed during the multiple transfer of the visible color images to the intermediate transfer body 9. After the four visible color images have been formed on the intermediate transfer body 9, the transfer roller 10 is moved upward to the position indicated by the dotted line by a cam member (not shown) in conformity with the timing at which the visible color images are transferred to the transfer medium 2. As a result, the transfer roller 10 is brought into pressured contact, at a prescribed pressing force, with the intermediate transfer body 9 via the intermediary of the transfer medium 2. In addition, a bias voltage is applied so that the visible color images on the intermediate transfer body 9 are transferred to the transfer medium 2.

The fixing unit 25, which fixes the transferred visible color images while transporting the transfer medium 2, has a fixing roller 26 for heating the transfer medium 2, and a pressurizing roller 27 for bringing the transfer medium 2 into pressured contact with the fixing roller 26. The fixing roller 26 and the pressurizing roller 27 are formed to be hollow and internally incorporate heaters 28, 29, respectively. That is, the transfer medium 2 bearing the visible color images is transported, heated and pressurized by the fixing roller 26 and pressurizing roller 27, whereby the toners are fixed on the surface of the transfer medium 2.

The fixed transfer medium 2 is subsequently ejected to a paper discharge unit by discharge rollers 34, 35, and 36, whereby the image forming operation is completed. Cleaning means cleans residual toner from the photosensitive drum 15 and intermediate transfer body 9. Toner waste left after the visible toner images formed on the photosensitive drum 15 are transferred to the intermediate transfer body 9 or toner waste left after the four visible color images formed on the intermediate transfer body 9 are transferred to the transfer medium 2 is stored in the cleaner container 15.

The transfer medium (printing paper) 2 to be printed out is taken out from the paper cassette 1 by a feed roller 3 and is transported so as to be embraced by the intermediate transfer body 9 and transfer roller 10, whereby a color toner image is recorded on the paper. The toner image is then fixed to the paper by passing through the fixing unit 25. In case of single-sided printing, a guide defines a transport path that leads the printing paper to the overlying paper discharge section. If the printing paper is to undergo double-sided printing, the guide forms a path that leads the printing paper to the underlying double-sided printing unit.

The printing paper that has been introduced to the double-sided printing unit first is fed into an area below the paper cassette 1 (see the transport path indicated by the two-dot broken line) by a transport roller 40, after which the printing paper is transported in the reverse direction and sent to a duplex tray 39. The printing paper received in the duplex tray 39 is upside down relative to the printing paper stacked in the paper cassette 1 and its orientation in terms of the transport direction is reversed. By performing transfer and fixing of a toner image again under these conditions, double-sided printing can be attained.

[Processing Procedure in Poster Printing]

Figure 10:
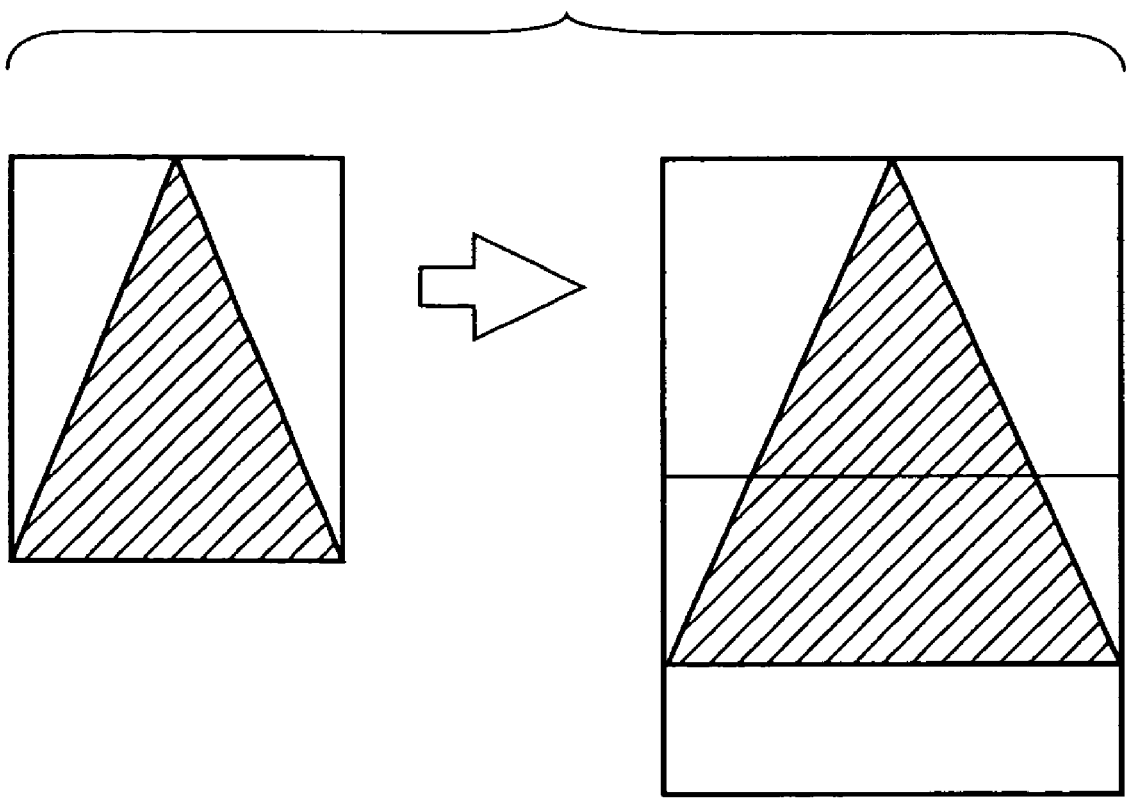
FIG. 10 is a schematic diagram exemplarily illustrating a result of poster printing realized by the printer 1500.

FIG. 10 is a schematic diagram exemplarily illustrating a result of poster printing realized by the printer 1500. A poster printing function provided in the printer refers to the function by which the content of one page drawn by an application is enlarged using the aforementioned printing system and the enlarged image is divided so that it is printed over a plurality of pages of paper. The output papers on which the enlarged image is printed are combined together, so as thereby to obtain an output result that is larger than the size of a paper usually supported by the printing system. FIG. 10 shows the result of the poster printing in the case where papers are used in landscape orientation (the number of sheets of paper; 1×2), where it is also possible to set the number of sheets of paper to 3×3, 4×4, or the like.

Figure 4:
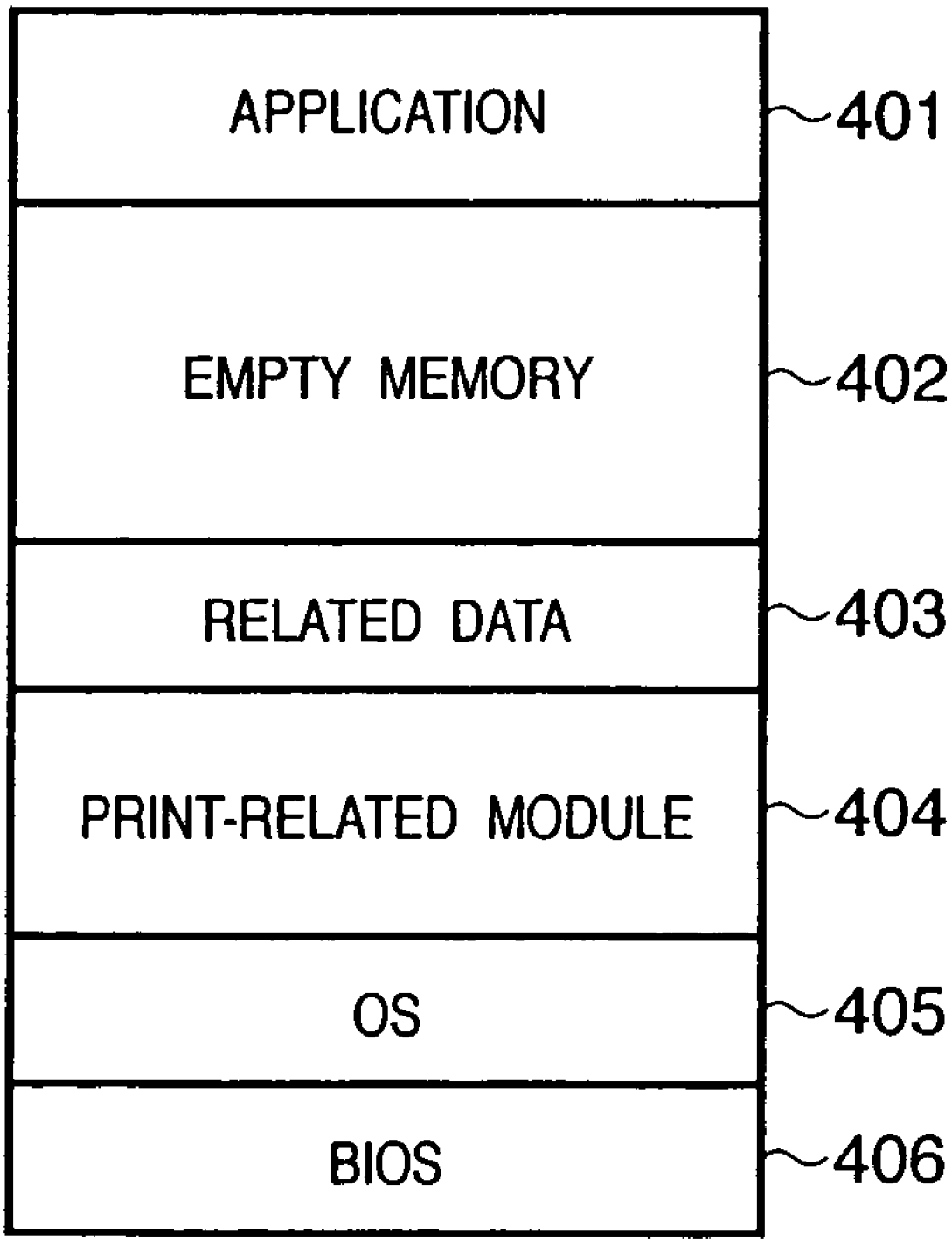
FIG. 4 is a schematic diagram showing a memory map in a state where a printing-related module including a print mode control program according to the embodiment is loaded onto a RAM 102 of the host computer 3000.

FIG. 4 shows a memory map in a state where a printing-related module including a print mode control program according to this embodiment is loaded onto the RAM 102 of the host computer 3000 and is then made operable. The memory includes application 401, empty memory 402, related data 403, print-related module 404, OS 405 and BIOS 406.

Figure 16:
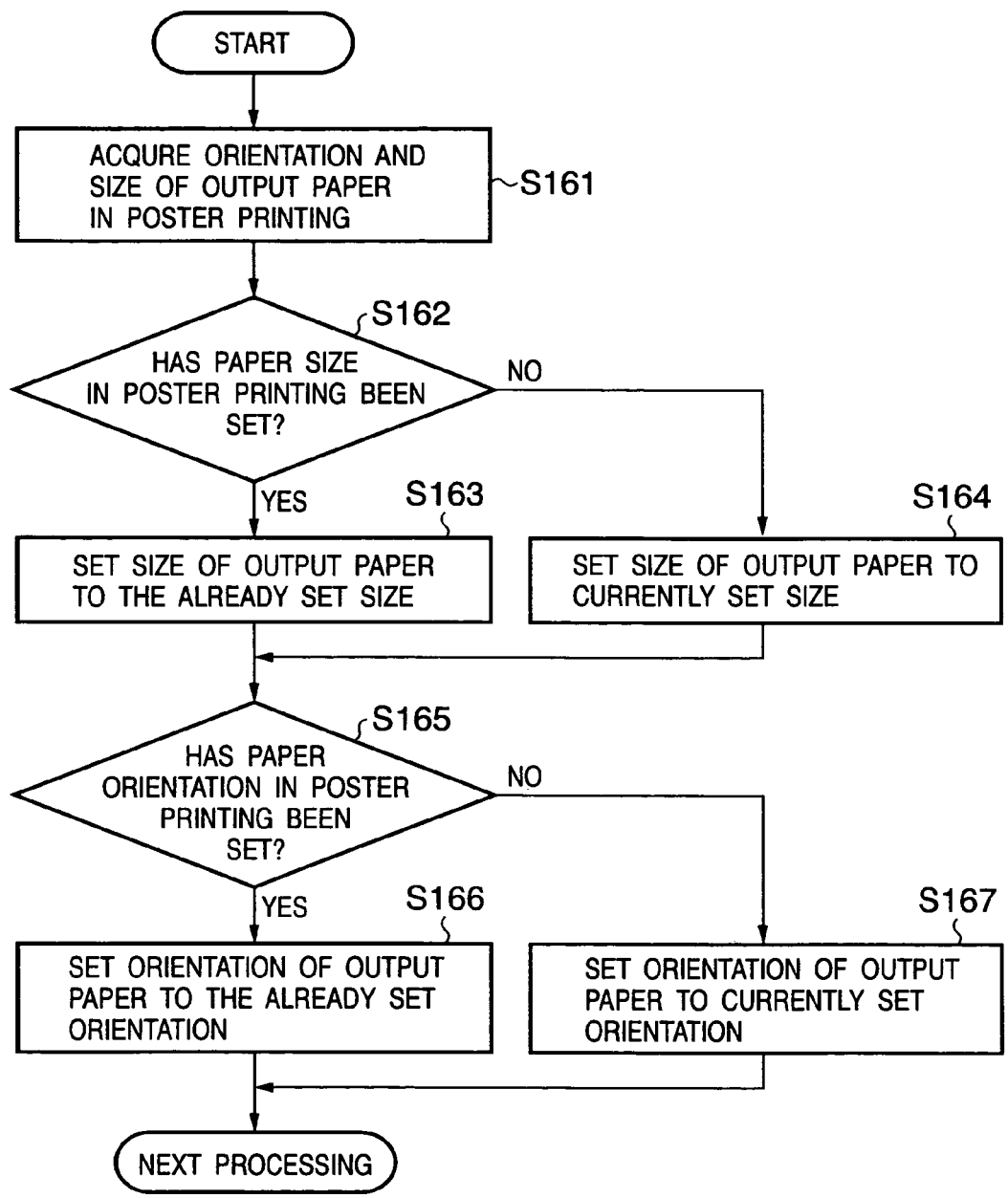
FIG. 16 is a flowchart illustrating processing procedures for acquiring various settings for poster printing in the embodiment.
Figure 17:
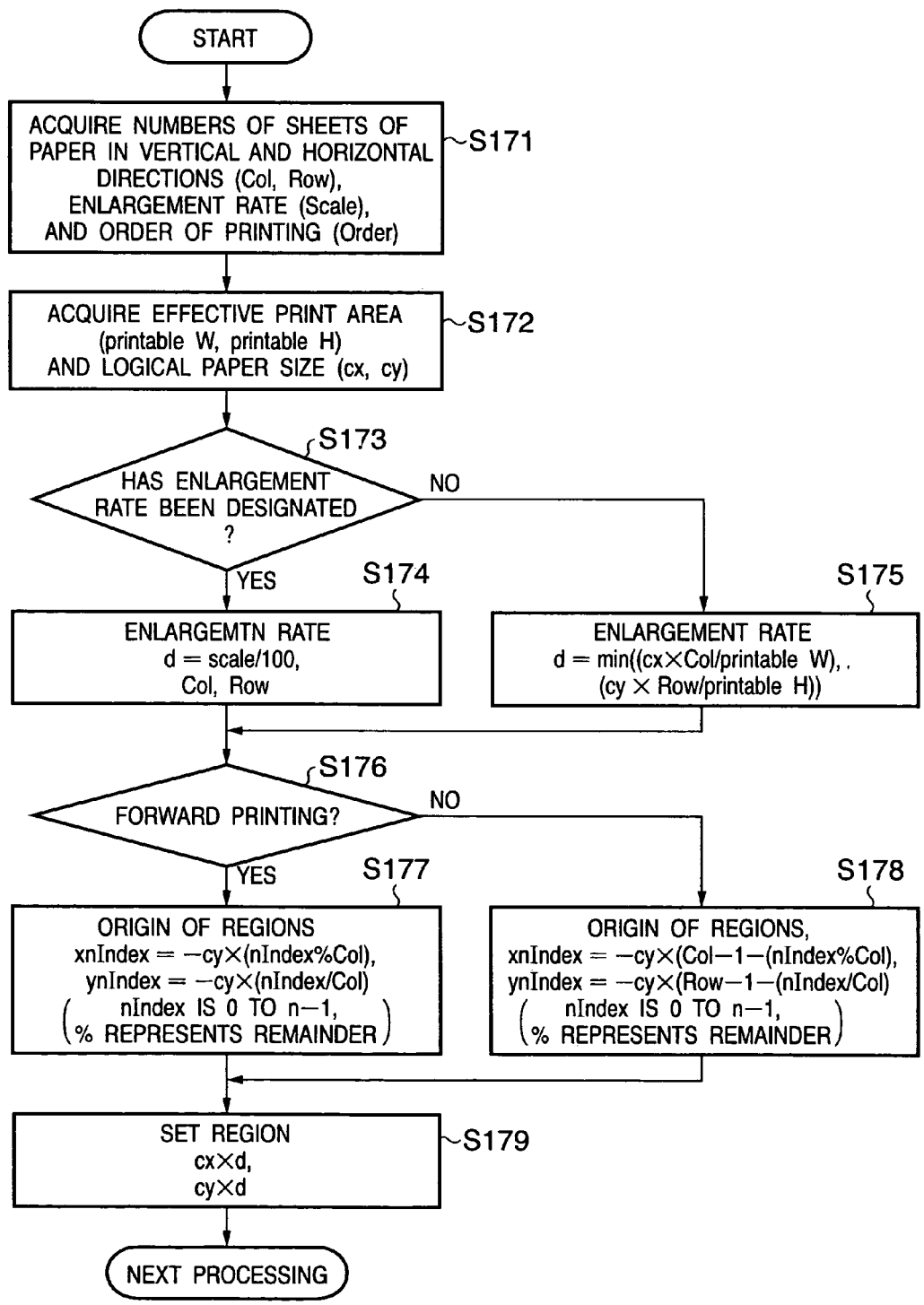
FIG. 17 is a flowchart illustrating processing procedures for determining an image-dividing manner and calculating an enlargement rate in the embodiment.

Here, descriptions will be provided for processing procedures of a print enlargement function (poster printing function) in the printing system according to the embodiment. This processing is implemented in the despooler 305 and is executed according to the flowcharts shown in FIGS. 16 and 17 when the despooler 305 sends the intermediate codes to the graphic engine 202. FIG. 16 is a flowchart illustrating processing procedures for acquiring various settings for poster printing in this embodiment, and FIG. 17 is a flowchart illustrating processing procedures for determining an image-dividing manner and calculating an enlargement rate.

First as shown in FIG. 16, settings related to a paper to be output are made by a user through his/her operation to a detailed print setting screen of the printer driver. The values to be set herein include an input original document size, an output paper size, paper orientation, and the number of sheets of paper necessary in poster printing. First, the orientation and size of the output paper set herein for poster printing are acquired (step S161). Next, it is determined whether the size of the output paper in poster printing has been set (step S162). When the size has been set (Yes), this set size is adopted as a set value in poster printing. When the size has not been set (No), the size of the output paper currently being set (i.e., a paper size which is set when the poster printing is about to be carried out) is adopted as a set value in poster printing (step S164).

After the setting processing for paper size in steps S163 and S164, it is determined whether the orientation of the output paper in poster printing has been set (step S165). When the paper orientation has been set in the printer 1500 (Yes), the set orientation is adopted in poster printing (step S166). When the paper orientation has not been set (No), the orientation of the output paper currently being set is adopted in poster printing (step S167). Through the above procedures, the size and orientation of the output paper are thus set.

Subsequently, a manner of enlarging and dividing an image is set according to procedures shown in FIG. 17. First, if the numbers of sheets of output paper in vertical and horizontal directions have been designated, the value of the numbers in both directions is acquired together with an order of printing, and if an image enlargement rate has been designated, the value thereof is also acquired together with the order of printing (step S171). Note here that the numbers of sheets of paper in vertical and horizontal directions are expressed by "Col" and "Row", respectively, and the enlargement rate and the order of printing are expressed by "Scale" and "Order", respectively. In advance of setting the image enlarging and dividing manner, a user sets the numbers of sheets of paper in vertical and horizontal directions or other necessary parameters in a window as shown in FIG. 5 obtained by operating the detailed print setting screen of the printer driver.

Next, the size of an effective print area of an original image and the size of logical paper are acquired (step S172). Both are represented in width and height, which are expressed by (printable W, printable H) for the size of the effective print area and by (cx, cy) for the logical paper size. The logical paper size mentioned here is that obtained as a result of setting the size and orientation of the output paper through the processes in the flowchart of FIG. 16.

Then, it is determined on the basis of the acquired values whether an enlargement rate has been designated (step S173). If the enlargement rate has been designated (Yes), the image is enlarged using the designated enlargement rate irrespective of the number of sheets of paper designated earlier (step S174). In this embodiment, since the enlargement rate "Scale" is entered as a percentage, the enlargement rate "d" is determined by $$d = Scale/100 \qquad (1)$$

At this time the numbers of sheets of paper in the vertical and horizontal directions, Col and Row, respectively, which are used in poster printing, are calculated. More specifically, a value obtained by rounding up the decimal fraction of a value printable H×d/cy is used as the number of sheets "Col" in the vertical direction, and a value obtained by rounding up the decimal fraction of a value printable W×d/cx is used as the number of sheets "Row" in the horizontal direction.

When the enlargement rate has not been designated in step S173 (No), the enlargement rate "d" is calculated by $$d = \min((cx \times Col)/\text{printable } W, (cy \times Row)/\text{printable } H) \qquad (2)$$

(step S175). The above equation (2) means that a ratio of the size of the original image to the size of the enlarged image is obtained in regard to each of the vertical and horizontal directions to employ the smaller of the ratios as an enlargement rate.

Executed next is processing for calculating a reference point used when dividing the enlarged image, that is, an origin of logical coordinates viewed from each of divided regions.

Since the processing for calculating the origin of logical coordinates is different depending on the order of printing, it is determined first whether to print in a forward order, on the basis of the previously acquired printing order "Order" (step S176). In accordance with the result of the determination, the origin of logical coordinates (xnIndex, ynIndex) viewed from each of n(n=Col×Row) image regions "nIndex" (nIndex is 0 to n−1) is obtained as follows:

In the case of forward printing (Yes), $$xnIndex = -cx \times (nIndex \% Col) \quad (3)$$

$$ynIndex = -cy \times (nIndex / Col) \quad (4)$$

(step S177)

where the operation "%I" indicates the remainder.

In the case of reverse printing (No), $$xnIndex = -cx \times (Col - 1 - (nIndex \% Col)) \quad (5)$$

$$ynIndex = -cy \times (Row - 1 - (nIndex / Col)) \quad (6)$$

(step S178)

As a result of the processes in steps S177 and 178, the origin of logical coordinates viewed from each image region to be output is calculated. The index "nIndex" indicates an order of output, according to which the image regions are output starting from the region whose index value is 0 in an order obtained by incrementing the index value from 0.

FIG. 6 is an example of an arrangement of output sheets of paper in poster printing performed in a forward order, and FIG. 7 is also an example of an arrangement of output sheets of paper in poster printing performed in a reverse order. As shown in FIG. 6, the forward printing causes image data to be output from upper left to lower right. In contrast, the reverse printing causes image data to be output from lower right to upper left.

Next, setting processing for obtaining the size of the enlarged image is executed (step S179). This is determined using the size of the original image and the enlargement rate which have already been acquired or calculated, by the following:

$$(cx \times d, cy \times d) \quad (7)$$

The thus obtained origin point coordinates of image regions output per each sheet of paper and the enlarged image size are sent from the despooler 305 to the graphic engine 202 where an enlarged, divided image is formed. The image is thereafter sent to the printer 1500 for printing (poster printing).

Figure 8:
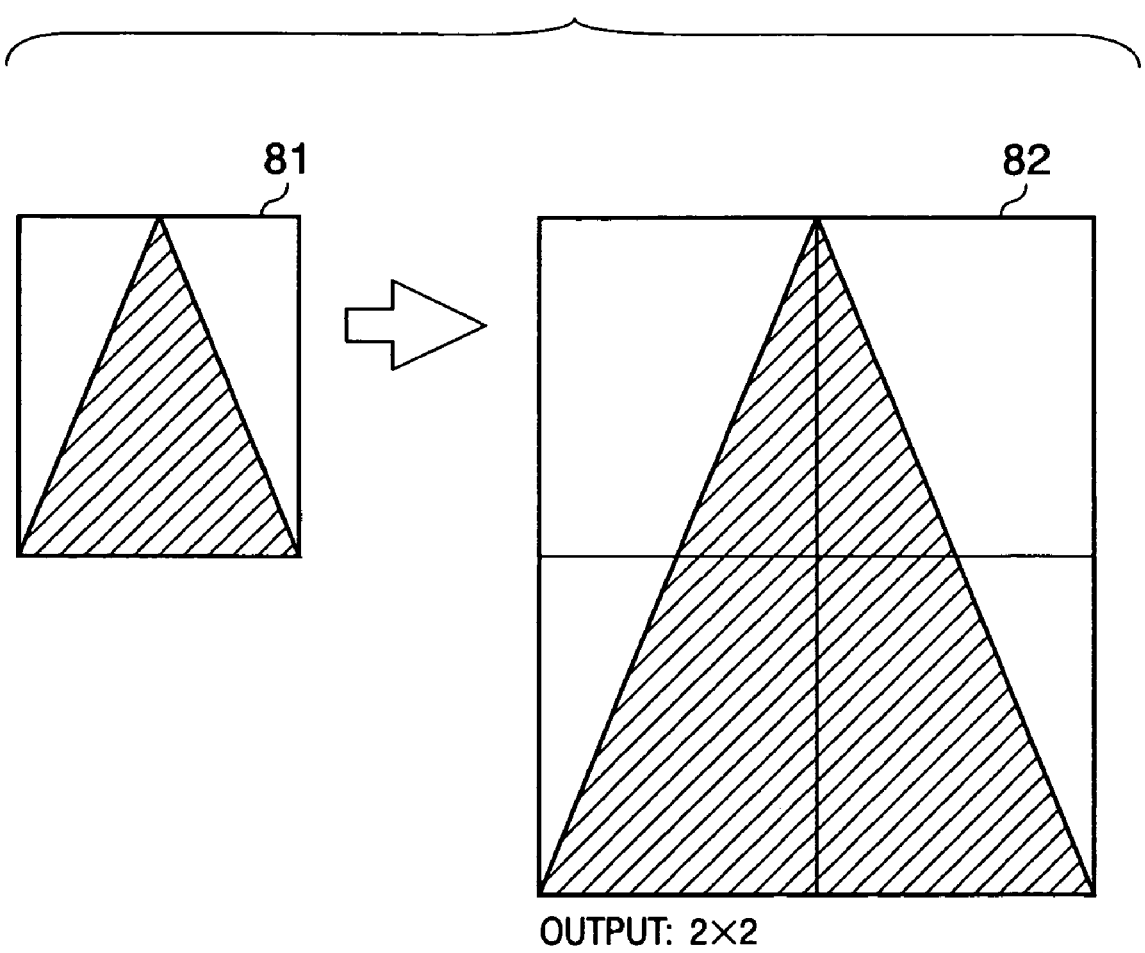
FIG. 8 is a diagram exemplarily showing a result of printing in the case where the number of sheets of paper in the vertical and horizontal directions has been designated to 2×2 without any designation of the size and orientation or the output paper and an enlargement rate.

FIG. 8 shows an example of a result of printing in the case where the number of sheets of paper in vertical and horizontal directions has been designated to 2×2 without any designation of the size and orientation of the output paper and the enlargement rate. In this example, the enlargement rate "d" is given by d=min (2cx/printable W, 2cy/printable H) where cx=printable W and cy=printable H. Accordingly, the enlargement rate "d" is 2 because of d=min (2,2). That is, an original image 81 is enlarged twofold in each of the vertical and horizontal directions and is divided into four parts composing an output image 82.

Figure 9:
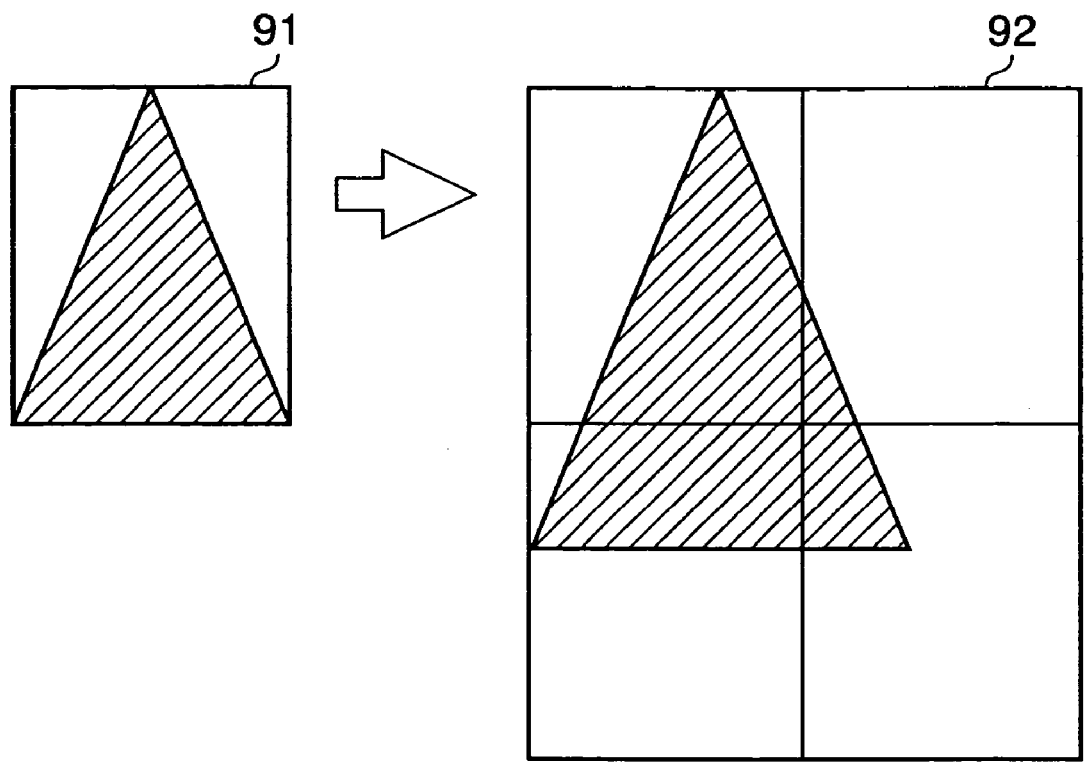
FIG. 9 is a diagram exemplarily showing a result of printing in the case where the enlargement rate has been designated to 150% without any designation of the size and orientation of the output paper.

FIG. 9 shows an example of a result of printing in the case where the enlargement rate has been designated to 150% without any designation of the size and orientation of the output paper. In this example, an original image 91 is enlarged by 150% in each of the vertical and horizontal directions and is divided into four parts composing an output image 92.

FIG. 10 shows, as described earlier, an example of a result of printing in the case where the orientation of the output paper has been designated to landscape orientation and the numbers of sheets of paper have been designated to two in the vertical direction and one in the horizontal direction, without any designation of the size of the output paper and the enlargement rate.

Upon completion of determining the image enlarging and dividing manner through the procedures of FIGS. 16 and 17, the printer driver 203 generates a command for creating an image in accordance with the determination, and then the command is sent to the printer 1500 so that it may carry out poster printing.

[Double-Sided Printing Function of Poster Printing]

Figure 18:
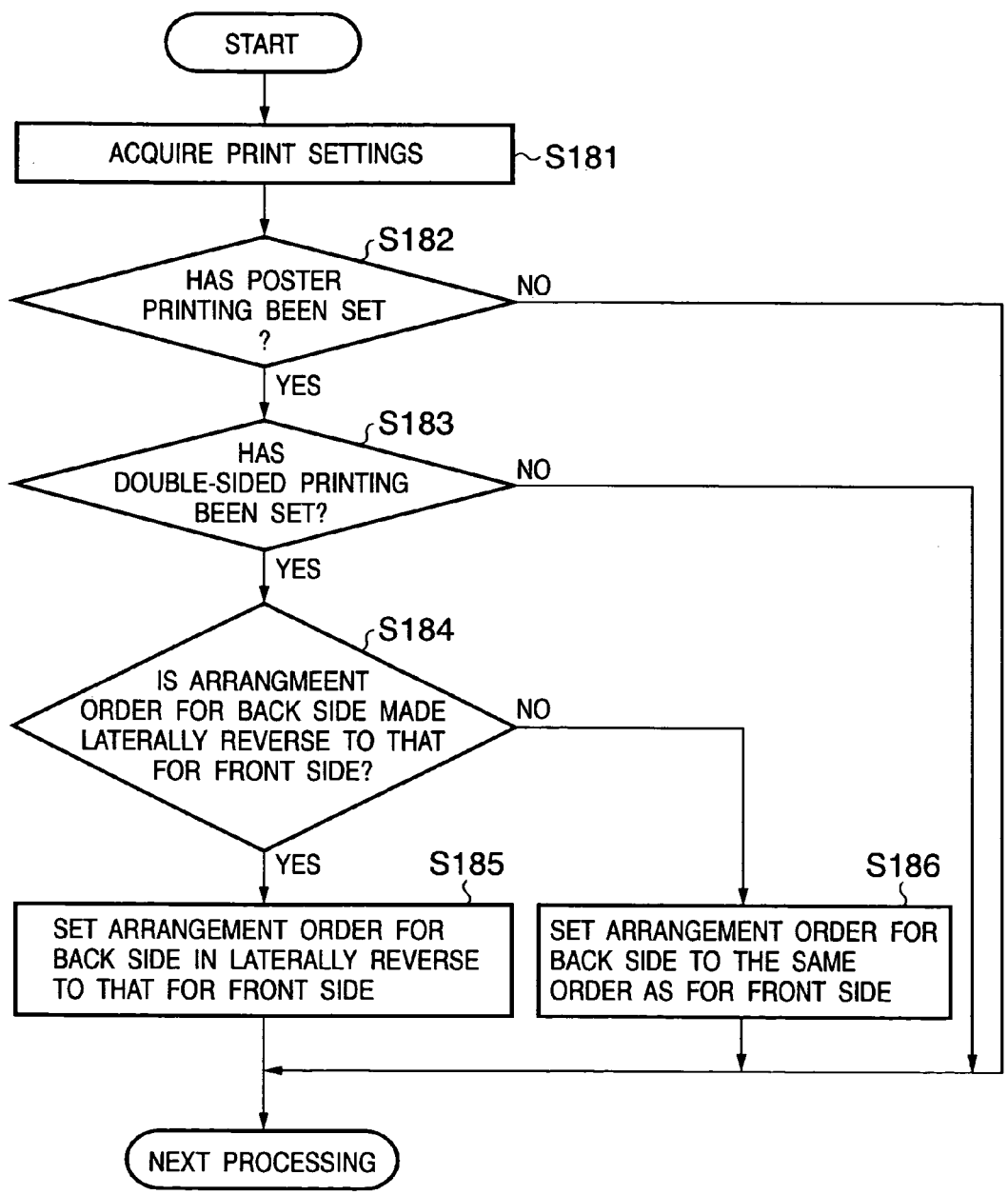
FIG. 18 is a flowchart illustrating processing procedures for setting a double-sided printing function in poster printing in the embodiment.

FIG. 18 is a flowchart illustrating processing procedures for setting a double-sided printing function in poster printing according to the embodiment. This processing is implemented in the despooler 305 and executed when the despooler 305 sends the intermediate codes to the graphics engine 202.

Figure 11:
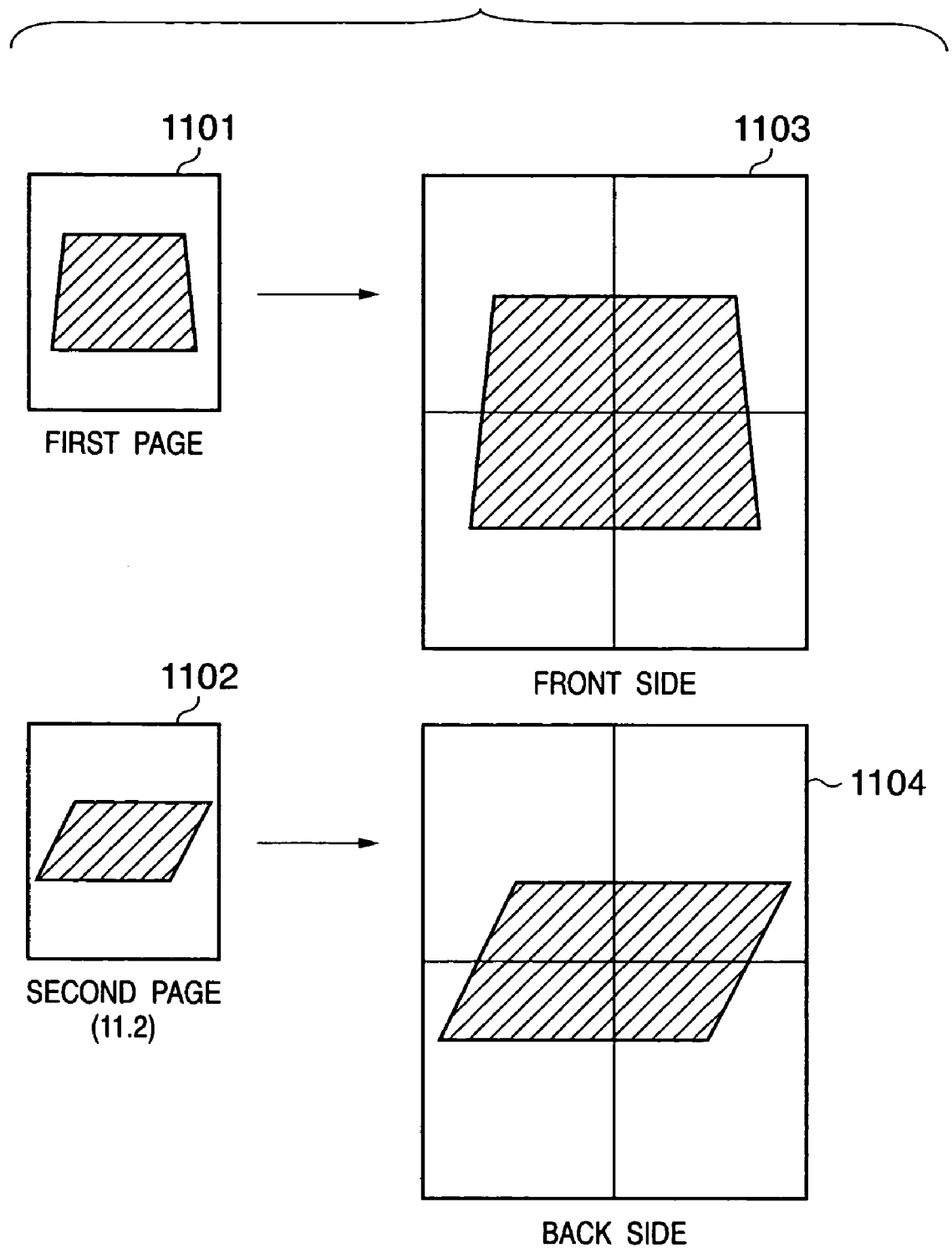
FIG. 11 is a diagram showing a result of poster printing in the case where two pages of documents are printed over 2×2 sheets of paper on their both sides.

FIG. 11 is a diagram showing a result of poster printing in the case where two pages of documents are printed on 2×2 sheets of paper on their both sides. More specifically, the following example will deal with the case where documents composed of a first page 1101 and a second page 1102 as shown in FIG. 11 are printed over 2×2 sheets of paper in poster printing (enlarging and dividing using four sheets of paper) and also printed on a front side 1103 and a back side 1104, respectively.

First, processing for acquiring print settings is executed (step S181). This processing is to acquire the print settings designated in, for example, a "print format" section on the user interface shown in FIG. 5. Next, it is determined whether poster printing has been set (step S182). This is performed to determine whether the information acquired in the print setting acquiring processing in step S181 indicates poster printing. Referring to the example of FIG. 5, "2×2" 52 is set as the number of sheets of paper, and also "poster printing" 51 is selected, therefore it is determined that the poster printing is ON.

When it is determined in step S182 that the poster printing is ON (Yes), it is further determined based on the information acquired in the print setting acquiring processing of step S181 whether double-sided printing has been set (step S183). Referring to the example of FIG. 5, "double-sided printing" 53 is set. When it is determined in step S183 that the "double-sided printing" has been set (Yes), it is further determined based on the information acquired in the print setting acquiring processing of step S181 whether an output order of sheets for the back side is reversed to an output order of sheets for the front side (Step S184). For example, "order reverse to front side" is set in FIG. 5.

Figure 12:
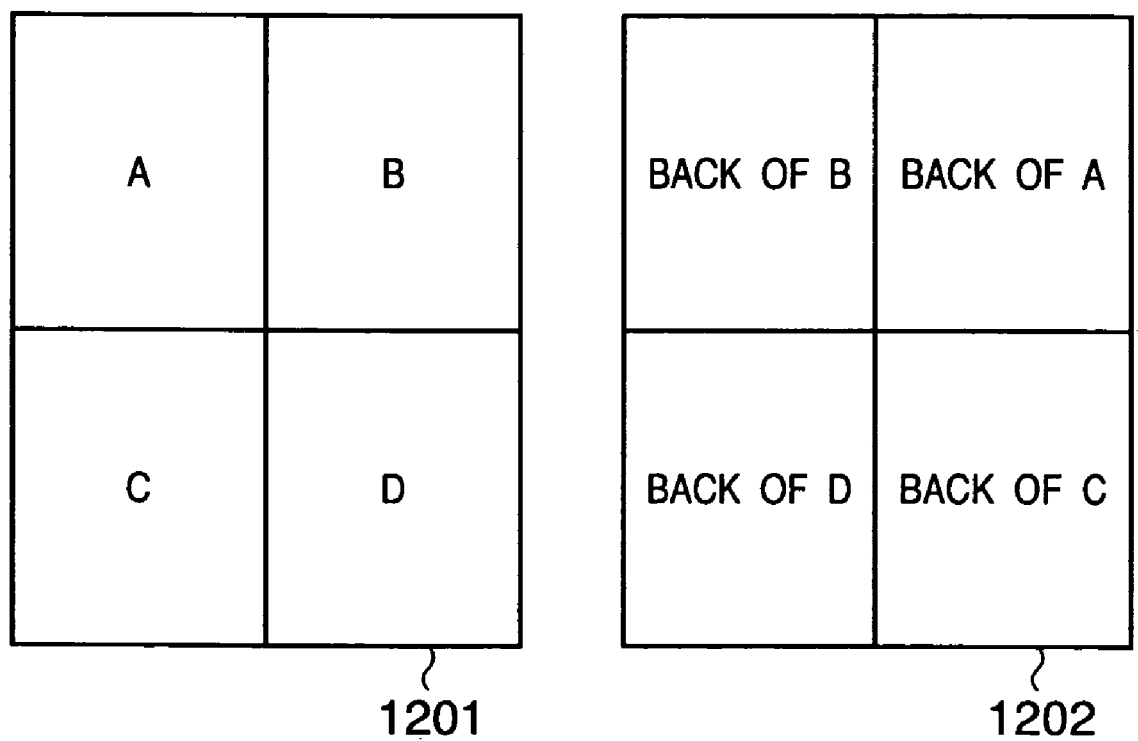
FIG. 12 is a diagram showing a relationship between a front side and a back side resulting from double-sided printing in poster printing using 2×2 sheets of paper.
Figure 13:
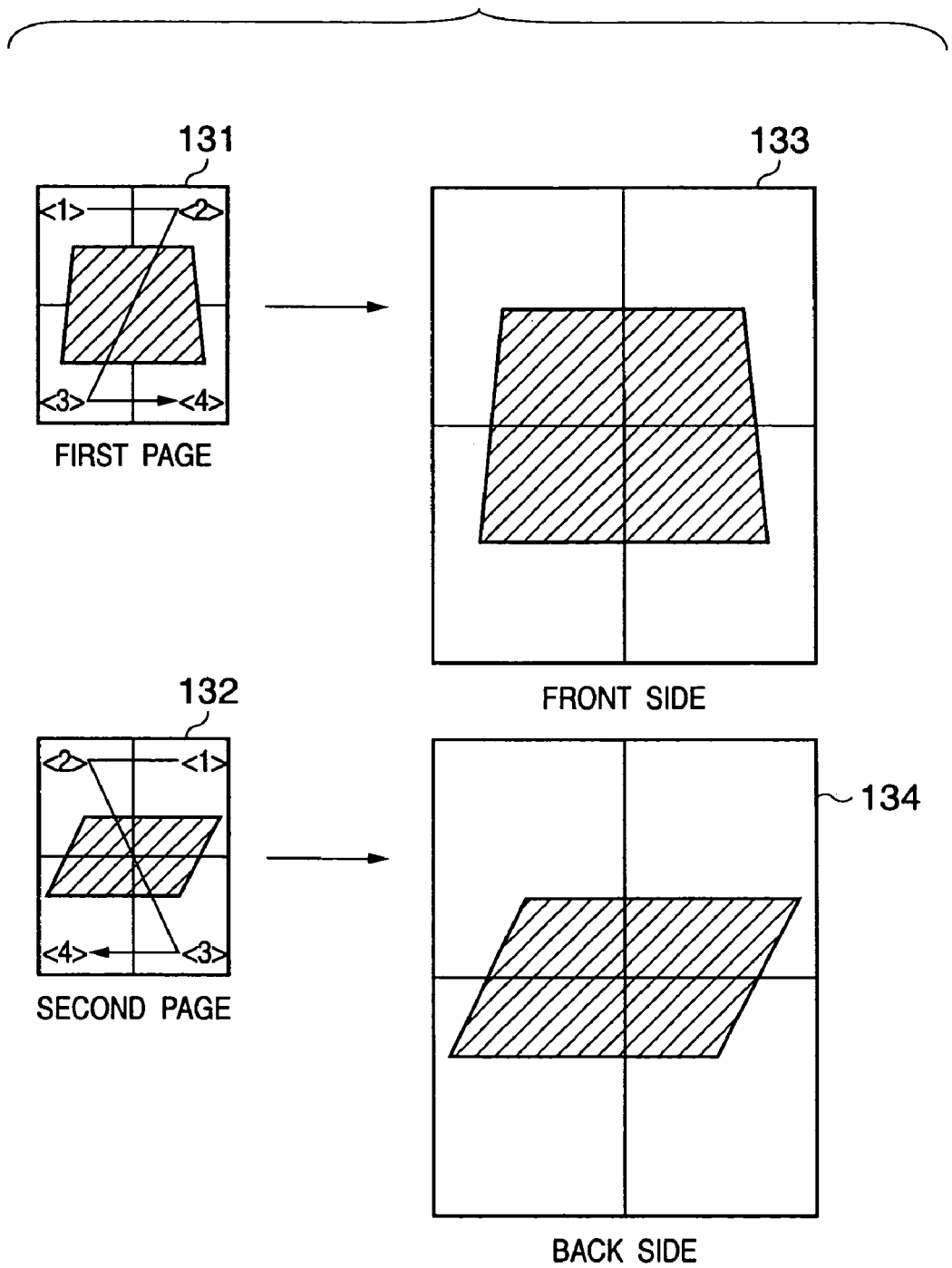
FIG. 13 is a diagram showing a result of poster printing in the case where output orders for the front and back sides are made laterally reverse to each other.

FIG. 12 is a diagram showing a relationship between a front side 1201 and a back side 1202 resulting from the double-sided printing in poster printing using 2×2 sheets of paper. As apparent from FIG. 12, an upper left sheet in the logical page on the front side corresponds to an upper right sheet in the logical page on the back side. Therefore, when printing is performed from left to right as well as from top to bottom in the logical page, the sheets of paper output first for the front side and back side are an upper left sheet and upper right sheet of the logical page, respectively. That is, satisfactory outputs of both sides are provided in output orders laterally reverse between the front side and back side. FIG. 13 is a diagram showing a result of poster printing in the case where the output orders for the front and back sides (133, 134) are made laterally reverse to each other.

Figure 14:
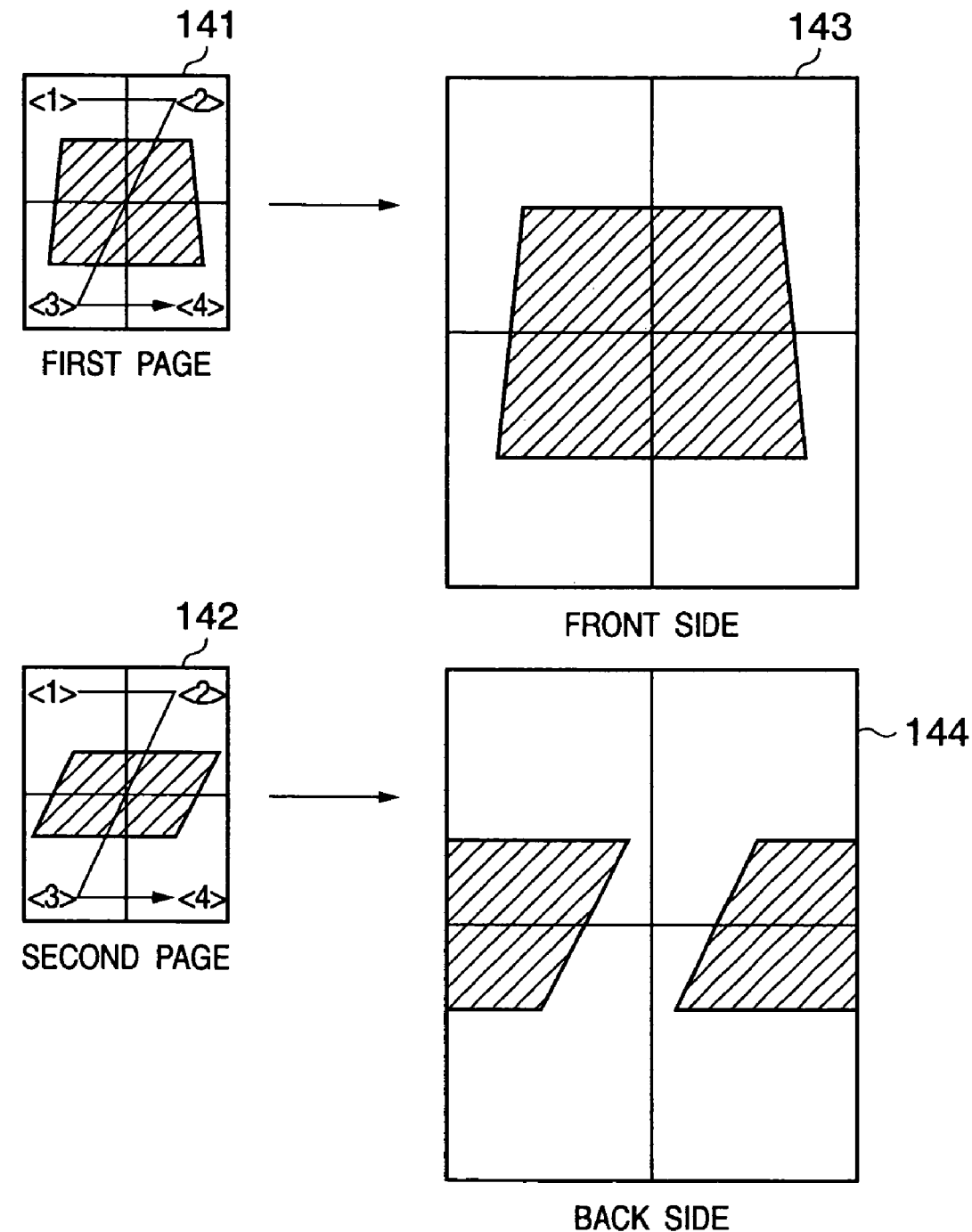
FIG. 14 is a diagram showing a result of poster printing in the case where the output orders for the front and back sides are made the same.

If the output orders for the front and back sides are made the same (No), the output order for the back side is identical to that for the front side (step S186), resulting in the output shown in FIG. 14. In this case, a back side original image is obtained by turning over every sheet of paper composing the logical page for the front side. FIG. 14 is a diagram showing a result of poster printing in the case where the output orders of the front and back sides are made the same.

Accordingly in step S184, the output order for the back side is selected whether to make it the same as for the front side or not. Referring to the user interface shown in FIG. 5, the output order for the back side is set to "order reverse to front side" 54, therefore it is set to an output order reverse to that for the front side (step S185). In accordance with such settings, the output order is controlled by the despooler 305 in this embodiment.

According to the embodiment, a printer capable of double-sided printing is able to print two consecutive pages of print data on both sides of a sheet of paper, and at the same time, the printer is able to enlarge each of the pages of print data and divide the enlarged data so that it is printed over a plurality of media (e.g., print papers and the like). This process is initiated at the host computer 3000 by dividing the first page of print data into a predetermined number of print data (e.g., the number of pieces of print data equivalent to the number of at least two or more media to be printed). Likewise, the second page of print data is divided into the predetermined number of print data (the number of pieces of print data equivalent to the number of at least two or more media which the first page of print data is divided into and printed on). Then, one piece of print data for the first page divided into the predetermined number of pieces of print data and one piece of print data for the second page divided into the same number of pieces of print data as the first data are selected. Next, the selected pieces of print data for the first and second pages are output to the printer 1500 so that the selected pieces of print data for the first and second pages are printed on the front and back sides, respectively, of the same medium.

Figure 15:
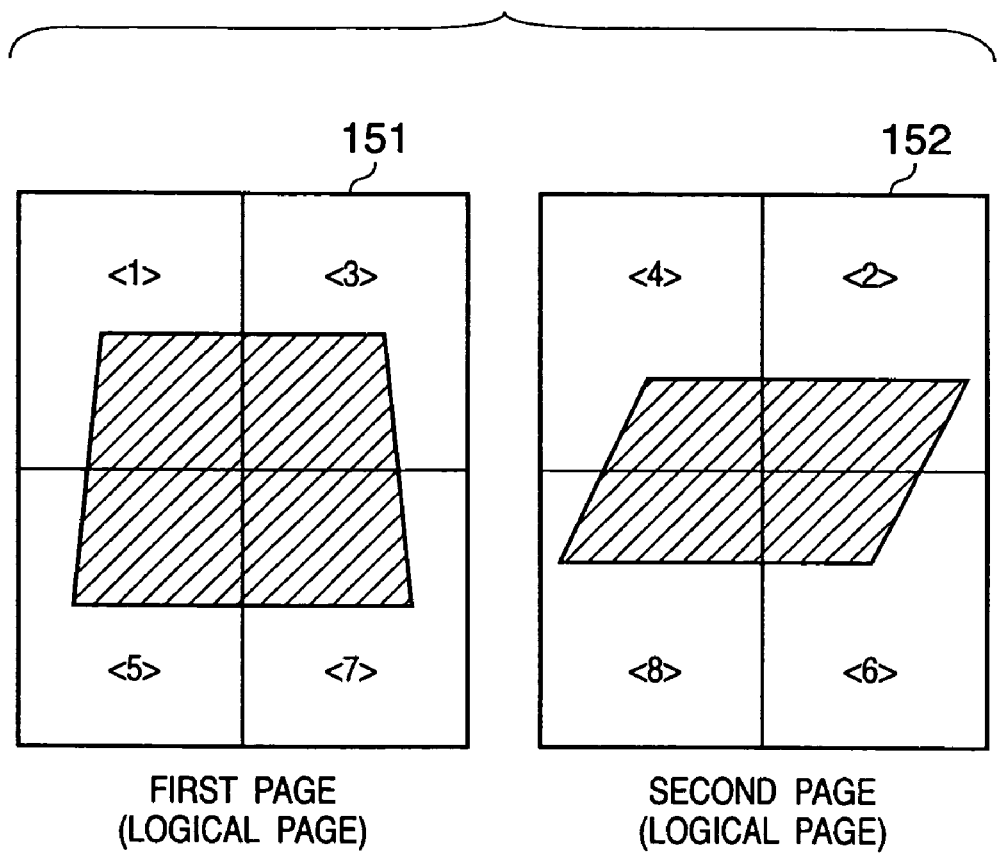
FIG. 15 is a diagram showing an output order in double-sided printing of poster printing using 2×2 sheets of paper.

FIG. 15 is a diagram showing an output order in double-sided printing of poster printing using 2×2 sheets of paper. In this embodiment, since the output order for the back side is set in laterally reverse to that for the front side, the first and second pages of logical page output from the despooler 305 are provided in an order shown in FIG. 15 from the relationship shown in FIG. 12. Output first is an upper left region <1> of the first page 151 in the four-part split logical page, and the next is an upper right region <2> of the second page 152 in the logical page which is the back side of the first page 151, which is followed by an upper right region <3> of the first page 151 in the logical page, and an upper left region <4> of the second page 152, and so on. In this manner, all regions in the logical page are successively output in the order from <1> to <8> shown in FIG. 15.

The description has dealt with the example in which 2×2 of sheets of paper are used for poster printing, however, it is also allowable to use any number of sheets of paper such as 3×3, 4×4, 2×3, or the like. In addition, the printing system in the embodiment is applicable not only to the case of outputting sheets of paper from top to bottom of a logical page as shown in FIG. 6 but also to the case of outputting from bottom to top as shown in FIG. 7.

In this embodiment, a selection mode of print data for the second page (e.g., an output order for the back side can be set to an "order reverse to front side") is designated on the user interface shown in FIG. 5. At this time, the second page of print data corresponding to the first page 131 of print data is selected in accordance with the selected mode. Furthermore, as shown in FIG. 13, the printing system according to this embodiment is applicable not only to the case of laterally turning over a print data sheet but also to the case of perpendicularly turning it over. In this case, the second page 132 is output in an order of <4>→<3>→<2>→<1> and printed so that each page of data in the vertical direction is output in a reverse order.

As described above, the printing system according to the embodiment realizes a double-sided printing function by controlling an output order of divided pages in poster printing. While the embodiment has dealt with the case where the print data is created by the host computer 3000, it is also allowable to design the printing system such that the printer 1500 is responsible for all processing of the print data.

[Other Embodiment]

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As described above, according to the present invention, poster printing and double-sided printing can be realized at the same time by suitably controlling an order of outputting pages for a divided image.

The present invention is not limited to the above embodiments and various changes and modification can be made within the spirit and scope of the present inventions. Therefore, to apprise the public of the scope of the present invention, the following claims are made.

What is claimed is:

1. A method of controlling printing executed in an information processing apparatus which communicates with a printer, comprising:

a setting step of setting printing attributes including poster printing to divide a page of print data into a predetermined number of pieces to print over a plurality of media, and double-sided printing to print a first page of print data on a front side of a medium and a second page of print data on a back side of the medium; and a generating step of generating print data such that a piece to be arranged at an upper left corner of a plurality of pieces comprising the first page of print data is printed on the front side of a medium and a piece to be arranged at an upper right corner of a plurality of pieces comprising the second page of print data is printed on the back side of the medium, when both of the poster printing and the double-sided printing are included in the printing attributes.

2. The method of controlling printing according to claim 1, wherein the generating step generates the print data such that a piece of the upper left corner of four pieces comprising the first page of the print data is printed on the front side of the medium, and a piece of the upper right corner of four pieces comprising the second page of the print data is printed on the back side of the medium, when poster printing to divide a page of print data into four pieces and double sided printing are both included in the printing attributes.

3. The method of controlling printing according to claim 1, wherein the generating step alternately generates print data of the piece of the first page and print data of the piece of the second page.

4. A computer-executable program stored on a computer-readable medium for causing a computer to execute:

a setting procedure of setting printing attributes including poster printing to divide a page of print data into a predetermined number of pieces to print over a plurality of media, and double-sided printing to print a first page of print data on a front side of a medium and a second page of print data on a back side of the medium; and a generating procedure of generating print data so that a piece to be arranged at an upper left corner of a plurality of pieces comprising the first page of print data is printed on the front side of a medium and a piece to be arranged at an upper right corner of a plurality of pieces comprising the second page of print data is printed on the back side of the medium, when both of the poster printing and the double-sided printing are included in the printing attributes.

5. The program according to claim 4, wherein the generating procedure generates the print data such that a piece of the upper left corner of four pieces comprising the first page of the print data is printed on the front side of the medium, and a piece of the upper right corner of four pieces comprising second page of the print data is printed on the back side of the medium, when poster printing to divide a page of print data into four pieces and double sided printing are both included in the printing attributes.

6. The program according to claim 4, wherein the generating procedure alternately generates print data of the piece of the first page and print data of the piece of the second page.

7. A printing control apparatus comprising:

a setting unit for setting printing attributes including poster printing to divide to print over a plurality of media, and double-sided printing to print a first page of print data on a front side of a medium and a second page of print data on a back side of the medium; and a generating unit for generating print data such that a piece to be arranged at an upper left corner of a plurality of pieces comprising the first page of print data is printed on the front side of a medium and a piece to be arranged at an upper right corner of a plurality of pieces comprising the second page of print data is printed on the back side of the medium, when both of the poster printing and the double-sided printing are included in the printing attributes.

8. The apparatus according to claim 7, wherein the generating unit generates the print data such that a piece of the upper left corner of four pieces comprising the first page of the print data is printed on the front side of the medium, and a piece of the upper right corner of four pieces comprising the second page of the print data is printed on the back side of the medium, when poster printing to divide a page of print data into four pieces and double sided printing are both included in the printing attributes.

9. The apparatus according to claim 7, wherein the generating unit alternately generates print data of the piece of the first page and print data of the piece of the second page.

* * * * *